United States Patent [19]

Hollis

[11] Patent Number: 4,577,006
[45] Date of Patent: Mar. 18, 1986

[54] DICYCLOPENTADIENE RESINS

[75] Inventor: Samuel D. Hollis, Savannah, Ga.

[73] Assignee: Union Camp Corporation, Wayne, N.J.

[21] Appl. No.: 712,207

[22] Filed: Mar. 15, 1985

[51] Int. Cl.$^4$ ............................................. C08F 232/08
[52] U.S. Cl. .................................................... 526/283
[58] Field of Search ..................... 526/308, 336, 340.3, 526/283

[56] References Cited

U.S. PATENT DOCUMENTS

| | | | |
|---|---|---|---|
| 4,002,815 | 1/1977 | Minchak | 526/308 |
| 4,110,528 | 8/1978 | Minchak | 526/283 |
| 4,178,424 | 12/1979 | Tenney | 526/283 |

Primary Examiner—Paul R. Michl
Attorney, Agent, or Firm—Kane, Dalsimer, Kane, Sullivan and Kurucz

[57] ABSTRACT

Disclosed are polymer resins which are copolymers of dicyclopentadiene and polyenes. The polymers have good dilutability and high softening points and are useful in coatings and printing inks.

3 Claims, No Drawings

DICYCLOPENTADIENE RESINS

BACKGROUND OF THE INVENTION

1. Field of the Invention

The invention relates to synthetic resins and more particularly relates to resins obtained by copolymerization of dicyclopentadiene with an aliphatic hydrocarbon polyene.

2. Brief Description of the Prior Art

The prior art literature is replete with descriptive synthetic polymeric resins prepared from dicyclopentadiene. Representative of such descriptions are those found in the U.S. Pat. Nos. 4,048,132; 4,136,247; 4,228,266; 4,239,874; 4,330,655; 4,400,340; and 4,433,100. The prior art synthetic resins have a variety of commercial applications, as tackifiers, coatings, extenders for elastomers, printing inks, etc. A general shortcoming of these resins is their low softening point. Thus, there is always a continued need for synthetic polymeric resins with higher softening points than those currently available. The synthetic polymeric resins of the present invention meet this need, providing resins of improved, higher softening points. The resins of the invention are particularly useful as the resin component of printing ink compositions.

SUMMARY OF THE INVENTION

The invention comprises the synthetic polymeric resin obtained upon polymerization of a mixture, which comprises;
(a) dicyclopentadiene; and
(b) an aliphatic hydrocarbon polyene having 8 to 12 carbon atoms, inclusive.

DETAILED DESCRIPTION OF THE INVENTION

Dicyclopentadiene (DCPD) is copolymerized with an aliphatic hydrocarbon polyene to produce a variety of products having usefulness as the resin component of coatings and printing inks. DCPD is a readily available ethylene production by-product. It is commercially available from Exxon Chemical Corporation, as Dicyclopentadiene-97, containing 97% reactable monomer.

A wide variety of aliphatic hydrocarbon polyenes are available for use in the preparation of the synthetic resins of the invention. Preferred as such polyenes are ocimene, alloocimene, dipentene and the like. Particularly useful are mixtures of alloocimene and dipentene. Such mixtures are commercially available (UCAO, a mixture of 35 to 25 percent manufactured by weight alloocimene and 55 to 65 percent other polyenes, principally dipentene; Union Camp Corp., Wayne, N.J.). The aliphatic hydrocarbon polyenes commercially available may also contain as much as 15 percent of hydrocarbon by-products of their preparation, having less than 8 or more than 12 carbon atoms. The presence of these hydrocarbons does not detract from the resin of the invention.

The copolymerization may be carried out by heating the monomer reactants in an appropriate vessel. The proportion of monomer reactants may be varied over a wide range. Advantageously, the weight ration of DCPD to polyene is within the range of from 1.0–2.0:0-.5–1.5.

Heating of its monomers is advantageously carried out within the range of from about 200° C. to 300° C., preferably circa 260° C. In general, the desired resin products are obtained after about 10–20 hours of heating. Progress of the desired polymerization may be followed by periodic sampling of the reaction mixture and analysis for solution viscosity.

The desired polymerization may be carried out at atmospheric or superatmospheric pressures. Advantageously, the copolymerization is carried out at autogenous pressures developed as the reaction proceeds. In general, pressures of from 20 to 100 psi develop autogenously.

The desired polymerization reaction may be carried out in the presence of an inert organic solvent for the monomer reactants. The term "inert organic solvent" as used herein means an organic solvent which does not enter into or adversely affect the desired course of the polymerization. Representative of inert organic solvents are n-hexane and the like.

At the conclusion of the polymerization, the desired polymer resin may be isolated from the reaction mixture by conventional methods such as by stripping solvent from the reaction mixture.

The polymerization may be performed as either a batch or continuous process. The reaction does not require a catalyst and produces hydrocarbon resins which can exceed the softening points of hydrocarbon resins presently used in non-gelling type paste links.

The hydrocarbon resins of the invention may also be hydrogenated. In one procedure, such treatment advanced the softening point from 120° C. to 134° C. after hydrogenation.

Because of their superior softening points and great dilutability the products of the invention can be especially advantageously utilized in coatings and printing inks. The starting materials are inexpensive and are available commercially. The process of manufacture can be carried out in standard conventional equipment.

The following examples describe the manner and process of making and using the invention and set forth the best mode contemplated by the inventors of carrying out the invention but are not to be considered as limiting. All parts are by weight unless otherwise indicated.

EXAMPLES 1–7

A series of seven copolymerizations are carried out by charging various proportions of dicyclopentadiene (Dicyclopentadiene-97, supra) and UCAO supra, to an appropriate vessel. The charges are heated to a temperature of circa. 260° C.

At this temperature, a pressure of 60 psi develops. This pressure drops to 48 psi after 16 hours. At the end of the period, the reactor is bled to atmospheric pressure than stem-sparged at 250° C. and poured up, 66% resin product is recovered based on the total initial charge. This corresponds to the reaction of 32% of the UCAO without correcting for mechanical loss. The product resins are tested for their softening points. The proportions of monomer reactants and the softening points of the resin products are shown in the table, below.

TABLE

| Example | Parts DCPD-97 | Parts UCAO | Softening Point |
|---|---|---|---|
| 1 | 60 | 40 | 173 |
| 2 | 50 | 50 | 135 |
| 3 | 40 | 60 | 102 |
| 4 | 80 | 20 | 185 |

TABLE-continued

| Example | Parts DCPD-97 | Parts UCAO | Softening Point |
|---|---|---|---|
| 5 | 60 | 40 | 167 |
| 6 | 60 | 40 | 165 |
| 7 | 60 | 40 | 166 |

I claim:

1. The synthetic polymeric resin obtained upon polymerization of a mixture, which comprises;
   (a) dicyclopentadiene; and
   (b) an aliphatic, conjugated hydrocarbon polyene having 8 to 12 carbon atoms, inclusive.
2. The resin of claim 1 wherein the conjugated polyene is alloocimene admixed with dipentene.
3. The resin of claim 1 wherein the aliphatic hydrocarbon polyene comprises alloocimene.

* * * * *